United States Patent
Kärkkäinen

(10) Patent No.: US 8,649,427 B2
(45) Date of Patent: Feb. 11, 2014

(54) IMAGE PROCESSOR, IMAGE GENERATOR AND COMPUTER PROGRAM

(75) Inventor: Tuomas Kärkkäinen, Turku (FI)

(73) Assignee: Gurulogic Microsystems Oy, Turku (FI)

( * ) Notice: Subject to any disclaimer, the term of this patent is extended or adjusted under 35 U.S.C. 154(b) by 597 days.

(21) Appl. No.: 12/816,970

(22) Filed: Jun. 16, 2010

(65) Prior Publication Data

US 2010/0322301 A1 Dec. 23, 2010

(30) Foreign Application Priority Data

Jun. 17, 2009 (FI) .................................... 20095686

(51) Int. Cl.
| | |
|---|---|
| H04N 7/12 | (2006.01) |
| G06K 9/36 | (2006.01) |
| G06K 9/00 | (2006.01) |
| G06T 15/00 | (2011.01) |
| G09G 5/00 | (2006.01) |
| H04N 11/04 | (2006.01) |

(52) U.S. Cl.
USPC ...... 375/240.01; 382/232; 382/165; 345/419; 345/611; 375/240.24; 375/240.26; 375/240.29

(58) Field of Classification Search
None
See application file for complete search history.

(56) References Cited

U.S. PATENT DOCUMENTS

| | | | |
|---|---|---|---|
| 4,013,828 A | 3/1977 | Judice | |
| 4,281,312 A | 7/1981 | Knudson | |
| 4,553,171 A | 11/1985 | Holladay et al. | |
| 6,392,643 B1 * | 5/2002 | Furuhashi et al. | 345/419 |
| 7,120,194 B2 | 10/2006 | Lee | |
| 2003/0026476 A1 * | 2/2003 | Shiiyama | 382/165 |
| 2003/0059119 A1 | 3/2003 | Buschmann et al. | |
| 2003/0095134 A1 * | 5/2003 | Tuomi et al. | 345/611 |
| 2006/0140488 A1 | 6/2006 | Yasunaga et al. | |

FOREIGN PATENT DOCUMENTS

| | | |
|---|---|---|
| EP | 0 633 701 A2 | 1/1995 |
| GB | 2 362 055 A | 11/2001 |
| WO | WO 2007/105951 A1 | 9/2007 |

OTHER PUBLICATIONS

"Interframe Compression Techniques", http://web.archive.org/web/20010218054412/http://www.newmediarepublic.com/dvideo/compression/adv07.html; julkinen, Feb. 18, 2001.

(Continued)

*Primary Examiner* — Joseph Ustaris
*Assistant Examiner* — Frederick Bailey
(74) *Attorney, Agent, or Firm* — Robert P. Michal; Lucas & Mercanti, LLP

(57) ABSTRACT

The invention relates to an image processor configured to: receive an image, take area-specific samples (11) of the image information of the area and calculate (12) a reference value (REF) on the basis of the samples; store into a memory (16) or to transmit (17) the reference value (REF) calculated for an area and the area identifier (ALUE) area-specifically; check (13) whether the reference value (REF) obtained as a result of the calculation and the image information (INF) corresponding to it have already been stored in the memory (16) or transmitted (15); and to store into the memory (16) or to transmit (15) the calculated reference value (REF) and the corresponding image information (INF), if the reference value (REF) and the corresponding image information (INF) have not been stored into the memory or transmitted previously.

11 Claims, 5 Drawing Sheets

(56) References Cited

OTHER PUBLICATIONS

G. Schaefer et at. "Visual pattern based colour image compression", Proc. of SPIE, vol. 3653 (Visual Communications and Image Processing 1999) pp. 989-997.

N. Nasrabadi et al., "Image Coding Using Vector Quantization: A Review", IEEE Tansactions on Communications, vol. 36, No. 8, Aug. 1988, pp. 957-971.

Choo, C.Y. et al., "A Hashing-based Scheme for Organizing Vector Quantization Codebook," International Conference on Acoustics, Speech, and Signal Processing. pp. 2495-2498, May 9, 1995.

Goldberg, M. et al., "Image Sequence Coding Using Vector Quantization," IEEE Transactions on Communications, vol. COM-34, No. 7, pp. 703-710, Jul. 1986.

Lee, C-H. et al., "A Fast Search Algorithm for Vector Quantization Using Mean Pyramids of Codewords," IEEE Transactions on Communications, vol. 43, No. 2/3/4, pp. 1697-1702, Feb./Mar./Apr. 1995.

Song, B.C. et al., "A Fast Search Algorithm for Vector Quantization Using L2-Norm Pyramid of Codewords," IEEE Transactions on Image Processing, vol. 11, No. 1, pp. 10-15, Jan. 2002.

Vasconcelos et al., "Llibrary-Based Image Coding", Proceedings of the International Conference on Acoustics, Speech and Signal Processing (ICASSP), vol. 5, Apr. 19, 1994, pp. V-489 to V-492.

Communication (Statement on Patentability) dated Feb. 28, 2012 issued by the Finnish Patent Office in related Finnish Application No. 20095686 (5 pages).

English language translation of Communication (Statement on Patentability) dated Feb. 28, 2012 issued by the Finnish Patent Office in related Finnish Application No. 20095686 (5 pages).

Communication (Communication pursuant to Article 94(3) EPC dated Feb. 21, 2013 issued by the European Patent Office in related European Application No. 10 165 979.5 (5 pages).

Wu, et al., "Fast vector quantization image coding by mean value predictive algorithm," Journal of Electronic Imaging, Apr. 2004, vol. 13(2), pp. 324-333 (10 pages).

\* cited by examiner

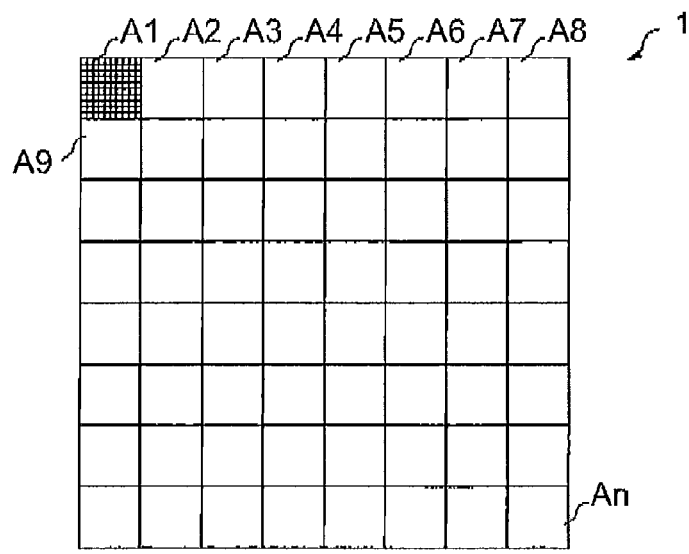
FIG. 1
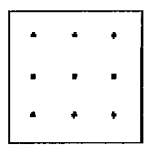 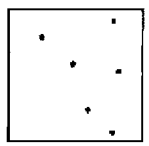 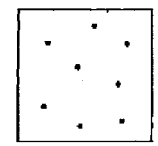 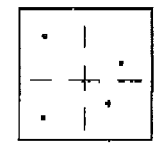 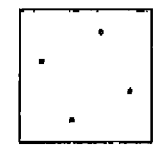
FIG. 2a    FIG. 2b    FIG. 2c    FIG. 2d    FIG. 2e
| REFERENCE VALUE | IMAGE INFORMATION |
|---|---|
| 1 | DATA_A |
| 2 | DATA_B |
| 3 | DATA_C |
| 4 | DATA_D |
| 5 | DATA_E |
| 6 | DATA_F |
| n | DATA_G |
FIG. 3a
| ALUE | REFERENCE VALUE |
|---|---|
| A1 | 1 |
| A2 | 253 |
| A3 | 99 |
| A4 | 253 |
| A5 | 1 |
| A6 | 14 |
| An | 253 |
FIG. 3b

IMAGE PROCESSOR, IMAGE GENERATOR AND COMPUTER PROGRAM

FIELD OF THE INVENTION

The invention relates to image processing and generation and particularly to a solution that allows an image or a video to be packed to a format occupying as little storage or transfer capacity as possible and allowing the image or video to be regenerated after the packing.

DESCRIPTION OF THE PRIOR ART

A key issue in the packing of images and video (hereinafter "image", for the sake of simplicity) is the amount of data in the packed image as the data is then stored in a memory for later use or transmitted for use to the recipient over a data transfer network. This data amount should be as small as possible.

Further, another important matter in packing is the generating of the packed image so that an image generated from stored or transmitted data corresponds to the original image as immaculately as possible.

A third matter crucial for packing is the required resources, i.e. rapid packing and unpacking of the image should require as little capacity as possible from the processor of the device used.

Prior art solutions for packing an image and for regenerating it after packing cannot meet the above criteria in a satisfactory manner.

SUMMARY OF THE INVENTION

An object of the invention is to solve the above problem and to provide a more efficient solution for image processing and for returning a processed image by regeneration. This is achieved by an image processor according to independent claim 1, an image processor according to independent claim 6, computer programs according to independent claims 10 and 11, and a computer-readable storage medium according to independent claim 12.

The invention employs the possibility of dividing an image into areas for which an area-specific reference value is calculated. If several areas have the same reference value, the image areas correspond to one another as to their outer appearance with sufficient precision and hence the image information of all the areas do not need to be stored or transmitted separately but it suffices that the image information for these areas is sent once. When an image for areas with the same reference values is generated, the same image information stored or transmitted previously is made use of by including the information in the areas of the image to be generated with the same reference value. This allows the repeated transmission or storage of the same image information to be avoided. Only when the image information concerned has not been stored or transmitted previously together with a corresponding reference value, the image information in question needs to be transmitted further or stored.

The preferred embodiments of the image processor and image generator of the invention are disclosed in the accompanying dependent claims.

BRIEF DISCLOSURE OF THE FIGURES

In the following the invention will be described in greater detail, by way of example, with reference to the accompanying figures, in which FIG. 1 illustrates the division of an image into areas;

FIGS. 2a to 2e illustrate sampling from an image area;

FIGS. 3a to 3b illustrate tables of data to be transmitted or stored;

DESCRIPTION OF AT LEAST ONE EMBODIMENT

Figure 4:
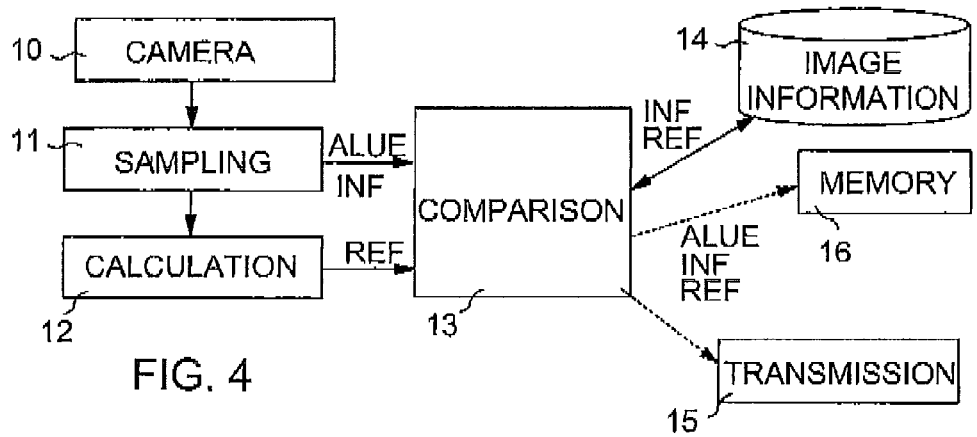
FIGS. 4 and 5 illustrate a first embodiment of an image processor.

FIG. 1 illustrates the division of image 1 into areas A1 to An. The number and size of the areas may be chosen separately in each case. An alternative is to divide an image into areas containing 8×8 pixels each. The colour intensity of the pixels is preferably at least 24 bits (RGB, Red-Green-Blue), but the best result is obtained by using as high colour intensity as possible, such as an intensity of 64 bits. A larger area of movement requires more precise colour intensity for producing an unique area.

FIGS. 2a to 2e illustrate sampling from an image area. It may be assumed, by way of example, that FIGS. 2a to 2e show sampling from area A1 of FIG. 1 which means that certain pixels from the image information in the area are chosen as samples.

Samples may be chosen using a supersampling technique known per se, which means that in the case of FIG. 2a a grid algorithm has been used for taking nine samples from the location shown with dots in FIG. 2. In that case each sample represents a numerical value of a pixel at the location in question, the value determining in practice the colour of the pixel. An alternative is to carry out sampling by a random algorithm (FIG. 2b), Poisson Disc algorithm (FIG. 2c), Jitter algorithm (FIG. 2d) or Rotated Grid algorithm (FIG. 2e).

When the necessary samples have been taken from the area being processed, a reference value is calculated for the image area in question on the basis of the samples. The reference value may be calculated so as to correspond to the average of the numerical values of the samples from the area, i.e. the pixels. Practical tests have shown that a good result is obtained for example by using an image area of 16×16 in size, the supersampling technique and the colour intensity of the pixels, which is 24 bits, and the original image size of 1920× 1080 pixels. The supersampling may be carried out as follows, for example:

1) The source image is divided into rectangles of an equal size, each rectangle corresponding to one image area.

2) A weighted sum of all the pixels inside the rectangle or intersected by the rectangle is calculated. A pixel value of a pixel located inside the rectangle receives a weighted value 1. If a pixel intersected by the rectangle and the rectangle have an intersection area a <1, the pixel value in question receives weighted value a.

3) For calculating a reference value, the weighted sum is divided by the surface area of the rectangle (expressed in pixels, in which case the surface area equals the horizontal number of the pixels in the rectangle multiplied by the vertical number of the pixels in the rectangle.

As disclosed above, by way of example, all pixels in an area are taken into account for calculating the reference value and the areas are specifically rectangular. However, this is not indispensable; the reference value may also be calculated by taking samples only from some of the pixels in the area and by dividing the image into areas of some other shape than rectangular, such as triangular.

FIGS. 3a to 3b are tables of data to be transmitted or stored. When samples of areas A1 to An of image 1 in FIG. 1 are taken in the manner disclosed in connection with FIGS. 2a to 2e and reference values are calculated on the basis of these values, the data given in tables 3a and 3b are stored simultaneously, or, alternatively, these data are immediately transmitted further to an image generator for regenerating the image at the reception end.

When samples are taken from area A1 of FIG. 1, for example, and reference value 1 is obtained on the basis of this for the area in question, reference value 1 is stored in the table of FIG. 3b in connection with the area identifier of area A1. Next it is checked whether image information corresponding to reference value 1 has already been stored in connection with reference value 1 in the table of FIG. 3A. Assuming that this has not been done, image information DATA_A of area A1 of FIG. 1 is stored in table 3a as image information corresponding to reference value 1, the image information thus distinguishing in practice all pixel values in the area. If the number of pixels is 8×8, the image information contains the values of 64 pixels, which thus represent the colours of these pixels.

The process continues by storing reference value 253 for area A2 in the table of FIG. 3b and image information of area A2 as image information corresponding to reference value 263 (not shown).

When proceeding to area A5, reference value 1 is obtained again. In that case reference value 1 is stored in the table of FIG. 3b for area identifier A5. Next, it is checked whether table 3a already contains image information stored for reference value 1. It is confirmed that this is the case because image information DATA_A of area A1 has been stored together with area A1 for reference value 1 in the table in FIG. 3b A, hence the image information does not need to be stored again for area A5.

The process proceeds as described above until all areas A1 to An of image 1 have been checked. FIG. 3b shows at each area identifier A1 to An the reference value of the area. In connection with image regeneration it thus possible to generate the original image by searching the table of FIG. 3a for image information DATA_A-DATA_G corresponding to the reference value of the area and the retrieved image information may be shown in the image in the area indicated by area identifier A1 to An. Image information in the table of FIG. 3a needs to be stored only once for each reference value, and an image for all the areas with the same reference value can be generated from the same image information. This enables to minimize the amount of image information to be stored, which in turn saves memory and data transfer capacity, depending on the application.

Figure 5:
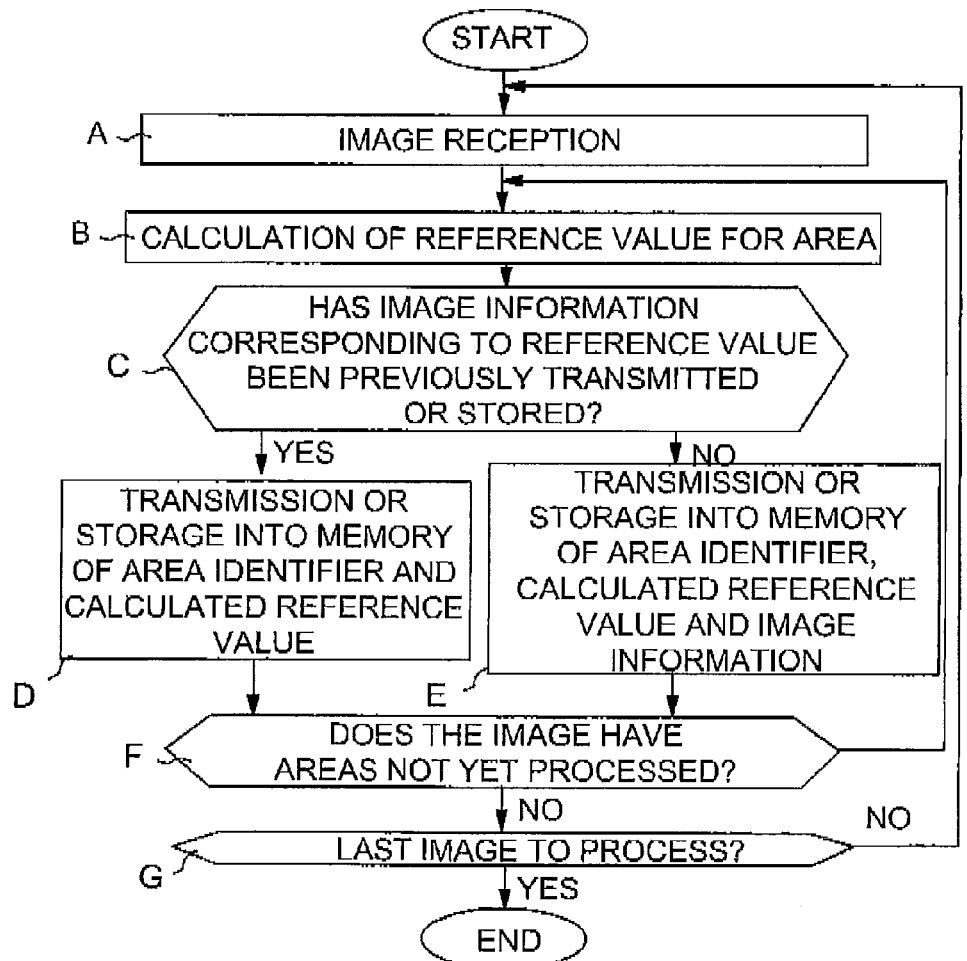

FIGS. 4 and 5 illustrate a first embodiment of an image processor. This example assumes that in step A the image processor receives from camera 10 an image signal containing an image. In practice the image signal may be received from some other medium than a camera, for example from a hard disk, disk or by reading from a memory. In step B sampling block 11 takes area-specific samples and calculation block 12 carries out area-specific calculation of the reference value as disclosed above with reference to FIGS. 1 and 2a to 2e, for example.

In step C comparison block 13 uses a database 14 containing image information in order to find out whether image information INF corresponding to a calculated reference value REF has been sent or stored previously. In that case the database 14 may contain the data of the table of FIG. 3a stored therein. The comparison block receives from the calculation block 12 the reference value REF calculated for an image area being processed and on the basis of that it performs a search in the database 14 to find out whether previous image information relating to the reference value REF has been stored in the database 14.

If the database 14 contains image information for the calculated reference value REF, this means that the image information has already been previously stored in the memory or transmitted further, i.e. it does not need to be sent or stored again. The comparison block 13 thus transmits in step D an area identifier ALUE obtained from the sampling block 11 and a reference value REF obtained from the calculation block 12 to the transmission block 15 for immediate further transmission through a telecommunications link to a receiving image generator, for example, or, alternatively, the comparison block 13 stores the area identifier ALUE and the reference value REF into a memory 16 for later use.

However, if the comparison block 13 detects in block C that the database 14 does not contain any image information for the calculated reference value REF, this means that the image information is new. In that case the comparison block 13 transmits in step E an area identifier ALUE obtained from the sampling block 11, a reference value REF obtained form the calculation block 12 and also image information INF obtained from the sampling block 11 to the transmission block 15 for immediate further transmission over a telecommunications link, for example, to a receiving image generator, for example, or, alternatively, the comparison block 13 stores the area identifier ALUE, reference value REF and image information INF into the memory 16 for later use. At the same time the comparison block 13 also transmits the reference value REF and the image information INF to the database 14 for storage into the database 14.

The transmission block 15 and the memory 16 are not necessarily both needed at the same time in the same device. If the data produced by the image processor is to be transmitted directly to the receiving image generator, for example, over a telecommunications link, the transmission block 15 alone is sufficient. Then again, if the data is not to be transmitted immediately, a memory alone is sufficient, and the data stored in the memory 16 may be transferred later for use by the image generator, either over a telecommunications link or by transferring them from the image processor to the image generator on a memory means, for example, such as a memory card, disk or hard disk.

In step F it is checked whether the image still contains areas that have not been processed. If so, the process returns to step B for processing the next area, i.e. the sampling block 11 takes samples from which the calculation block 12 calculates a reference value and on the basis of this the comparison block 13 acts as described above. Only after all the areas in the image have been handled does the process proceed to step G.

If a single image only is to be processed, there are no more images and the image processor stops its activity after step G. However, in the case of a video, for example, containing a plural number of successive images, the process returns from step G to step A until all the images in the video have been processed as described above.

As regards a video image, an embodiment allows the sampling block 11 to also produce an index for the comparison means 13 to show which image is being processed, i.e. which image in the video is the one linked with the last reference value and area identifier. The comparison means transmits this index further through block 15 or stores it into the memory 16 together with the area identifier ALUE and the reference value REF. The use of this index is no necessary in all embodiments. The block diagram in FIG. 4 is only meant to illustrate the operation of the video processor, without restricting its physical structure. In practice the image processor may be implemented with a circuitry running a computer program. More specifically, the sampling block, calculation block, comparison block and transmission block may be implemented by a circuit solution or as a combination of a computer program and circuit solutions, in which case the processor, for example, runs a specific program for providing the operation of the blocks. The memory 16 and the database 14 may be implemented with a single memory means, such as a memory circuit or a hard disk. An alternative is that the image processor is in practice composed of a computer, IP camera, mobile phone or a palmtop with a camera connected thereto or integrated therein and arranged to run a computer program that controls the device in question as described above.

Figure 6:
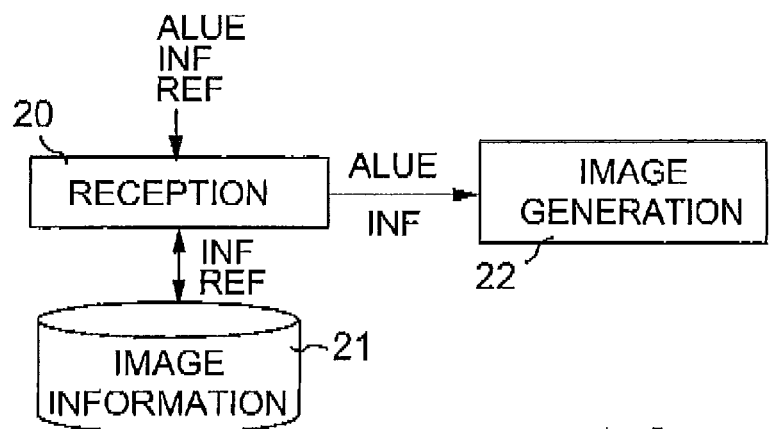
FIGS. 6 and 7 illustrate a first embodiment of an image generator.
Figure 7:
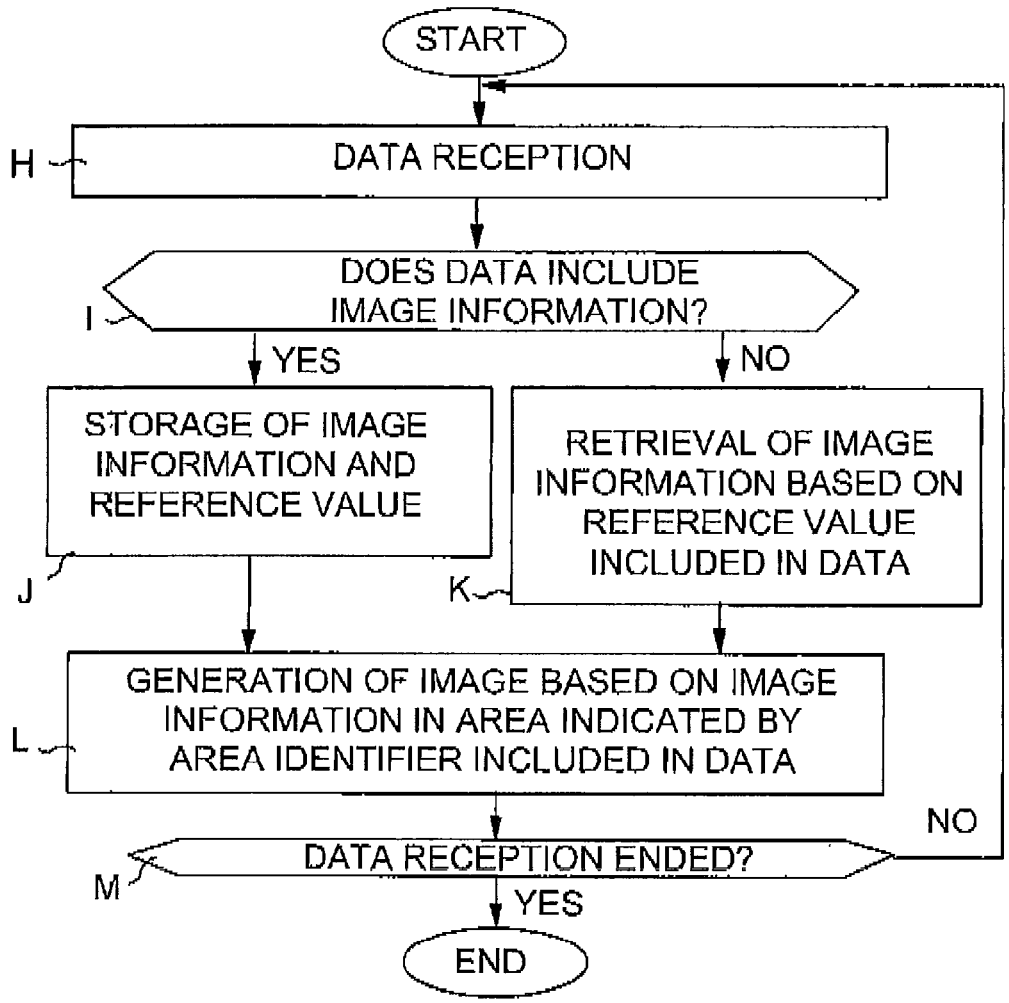

FIGS. 6 and 7 illustrate a first embodiment of the image generator. The image generator of FIG. 6, which may function according to the flow chart of FIG. 7, may be a mobile phone, IP camera, computer or palmtop, for example, receiving data over a telecommunications link from the image processor disclosed with reference to FIGS. 5 and 6 and immediately generates an image for a display device on the basis of the received data. This may relate to a video conference, for example, or generally to equipment suitable for transmission of video, whereby the video may be packed into a compact format for transmission over the telecommunications link and restored by the image generator to correspond to the original image with an extremely high precision.

In step H a reception block 20 receives data over the telecommunications link. The data to be received contains at least an area identifier ALUE, which individually distinguishes the area in the image that the reference value REF contained in the data relates to. In addition, the data may also contain an index indicating which image is being processed. In the case of a video, for example, the index may show which image in the video is the one that the received reference value and the area identifier relate to. Further, the received data may also include image information INF together with the area identifier ALUE and the reference value REF. In step I the reception block 20 checks whether image information INF is contained.

If the check shows that image information is included, the reception block 20 stores in step J the image information INF and the reference value REF into a database 21. This enables to collect, bit by bit, data corresponding to those in the table of FIG. 3a into the database during the operation of the image generator. When the image information has been stored, the reception block 20 transmits in step L the received area identifier ALUE and the received image information INF to a generating block 22, which on the basis of the image information INF generates an image to an area corresponding to the area identifier ALUE of the image to be generated.

Then again, if the check shows that no image information is included, i.e. the data received has an area identifier ALUE and reference value REF but no image information, the reception block 20 searches in step K the database 21 for corresponding image information INF on the basis of the reference value REF. This means a pair made up of image information and a reference value has already been received and stored into the database 21. The reception block 20 then transmits the received area identifier ALUE and the image information INF retrieved from the database in step L to the image generation block 22, which generates an image to an area corresponding to the area identifier ALUE of the image to be generated on the basis of the image information INF.

In step M it is checked whether data reception has ended. If not, the process returns to step H for receiving new data. The steps of the flow diagram of FIG. 7 are thus repeated until data has been received for all necessary areas of the image and an image has been generated on the basis of this to the correct image area using the received or stored image information. However, it is not always necessary to produce an image for all image areas on the basis of the image information, because in connection with video reproduction, for example, it is possible to generate an image using a previous video image as a basis and to change only those parts that have been altered. Hence data is received only for the image parts that have changed with respect to the previous generated image.

The block diagram of FIG. 6 is only meant for illustrating the operation of the image generator without restricting its structure. In practice the image generator may be implemented as a circuitry running a computer program. More specifically the reception block and the image generation block may be implemented as a circuit solution or as a combination of a computer program and circuit solutions, a processor, for example, running a specific program for carrying out the operation of the blocks. The database 21 may be implemented with one individual memory means, such as a memory circuit or hard disk.

Figure 8:
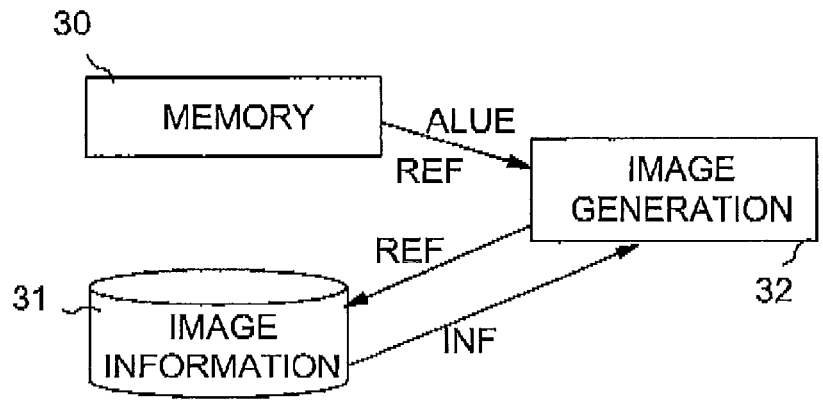
FIGS. 8 and 9 illustrate a second embodiment of an image generator.
Figure 9:
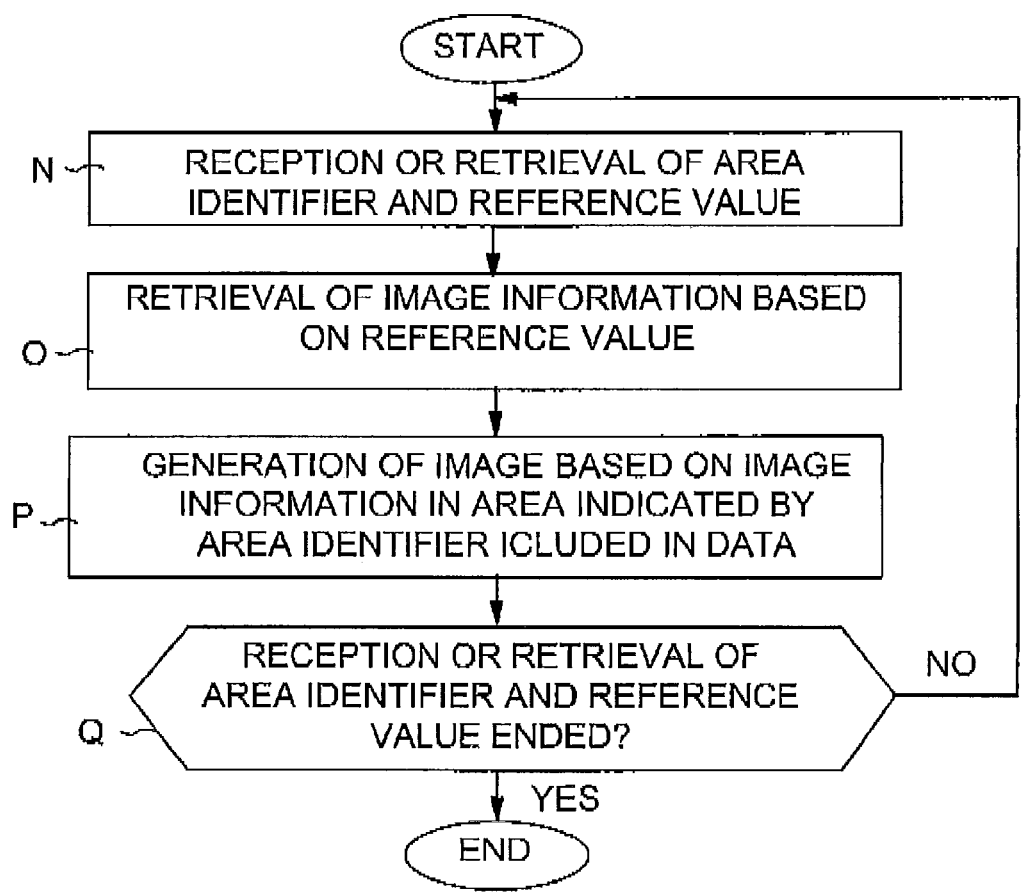

FIGS. 8 and 9 illustrate a second embodiment of the image generator. The image generator of FIG. 8, which may operate as shown in the flow diagram of FIG. 9, may be a mobile phone, IP camera, computer or palmtop, for example, with the information of tables 3a and 3b stored in the memory thereof and which generates an image or a video on the basis of these. An alternative is that the necessary data are transferred to the image generator on the computer-readable storage medium, such as a memory card, disk or hard disk.

In the following we assume, by way of example, that the memory 30 has the information of the table of FIG. 3b stored therein, i.e. the area identifiers ALUE of the image areas to be generated in a correct order and the corresponding reference values REF and that the image information database 1 has the information of the table of FIG. 3a, i.e. the reference values REF and the corresponding image information INF stored therein. In addition to the above data, also an index may be stored in the memory to indicate which one of the images (in numerical order) a specific area identifier and a corresponding reference value relates to, so that when a video, for example, is to be generated, the image information of a specific area can be generated into the correct image.

In step N the area identifier ALUE of a first area to be processed and the corresponding reference value REF are read from the memory 31 and given for use to the generation block 32 of the image. On the basis of the received reference value REF the generation block 32 then searches in step O for the image information INF corresponding to the reference value. Next the image generation block 32 generates on the basis of the image information INF in step P an image into an area corresponding to the area identifier of the image. In step Q it is checked whether the processing of the last area has been completed, and if not, the process returns to step N.

The block diagram of FIG. 8 is only meant to illustrate the operation of the image generator without restricting its structure. In practice the image generation block 32 may be implemented as a circuit solution or as a combination of a computer program and circuit solutions, in which case a processor, for example, runs a specific program for implementing the operation of the block. The database 31 and the memory 30 may be implemented as one individual memory means, such as a memory circuit or a hard disk. An alternative is that the image generator of FIG. 8 is a computer, mobile phone, IP camera, palmtop or the like, which on the basis of the data stored in its memory or data read from a memory means generates an image or a video to a display device.

Unlike in the embodiments of the figures, a conceivable variation is also one in which the image generator memory contains an image information database 21 or 31 stored therein in advance and provided with the information shown in the table of FIG. 3a. Alternatively, these data may be read from a memory means, such as a memory card or a disk. However, the information shown in the table of FIG. 3b may be transmitted to the image generator over a telecommunications link without having to store them in any step into the memory of the image generator.

Figure 10:
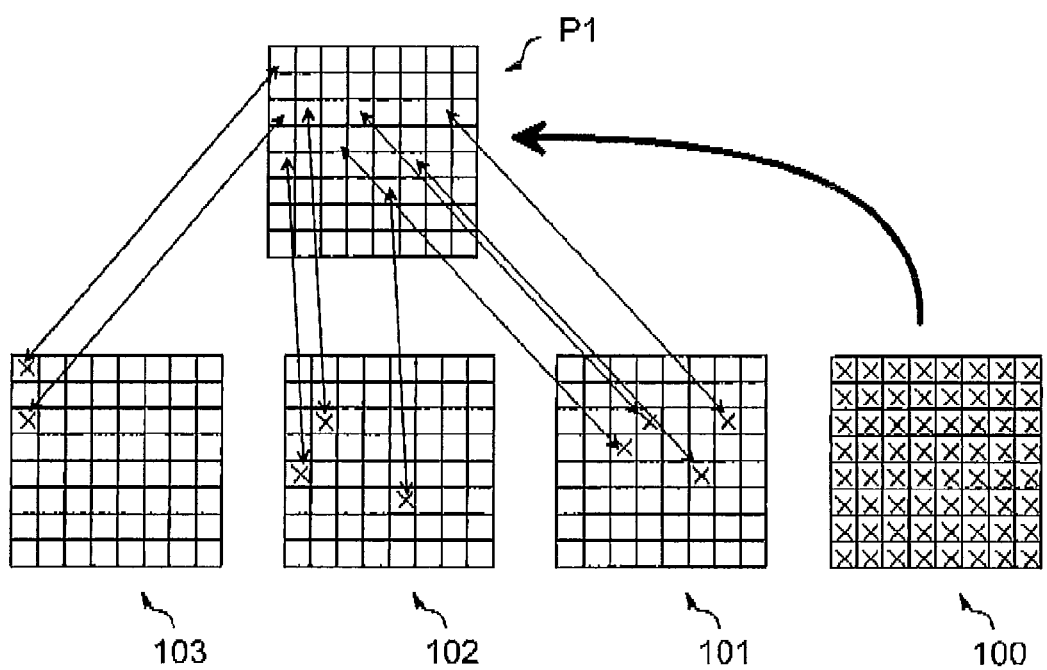
FIG. 10 illustrates processing of a video image.

FIG. 10 illustrates video image processing according to an embodiment. In this embodiment the image processor searches the image next on line for processing for image areas that have changed and only data relating to these are stored into the memory or transmitted to the image generator for use.

In this embodiment the image processor maintains in the memory data on the references of the areas of the image processed last, which is illustrated by figure P1. The memory thus contains the reference value REF of each area of figure P1 stored in the memory, in connection with the area identifier. At the beginning, i.e. before the processing of the first video image, it is assumed that reference value 0, for example, has been stored for each area.

When the first video image 100 comes up for processing, sampling and reference value calculation are carried out, as disclosed above, for each area in the image 100. The areas of the image 100 are then processed one by one and the reference values calculated for them are compared with the reference values of corresponding reference values of figure P1 in the memory. In connection with the processing of the first image 100 it is detected that the reference values of all areas in image 100 deviate from the reference values of corresponding areas in figure P1 maintained in the memory. The changed values of image 100 are indicated with a cross in FIG. 10. An arrow is used to illustrate that the reference values of all areas of image 100 are stored into corresponding areas of figure P1 maintained in the memory. The reference values of these areas are also stored in the memory or transmitted for use in the image generator. When the first image is being processed, image information corresponding to the reference values of the changed areas has not been transmitted earlier or stored in the memory, which is why it is done at this stage.

The next image to be processed is image 101. After sampling and reference value calculation follows comparison, in which the reference values of the areas in image 101 are compared one by one with the reference values of corresponding areas in figure P1 stored in the memory. It is observed (in this example) that only the reference values of areas of image 101 marked with a cross in FIG. 10 deviate from the reference values of corresponding areas of figures P1. In other words, only the areas marked with a cross have changed.

In that case only the reference values of the changed areas marked with a cross are stored in the memory or transmitted together with an index showing that areas of image 101 are concerned. At the same time the reference values of the changed areas are stored into corresponding areas of figure P1 to replace previous reference values maintained for these areas.

If the check shows that image information corresponding to the reference values of the changed areas has not been previously transmitted or stored into the memory, this is carried out similarly as described in connection with the embodiments above.

Next in line for processing is a video image, i.e. image 102. Again, sampling and reference value calculation are carried out for each area separately. This is followed by a comparison to find out which image areas have changed. Again, the comparison is made using figure P1 maintained in the memory and, at this stage, updated with the changed areas of the previous processed image 101. The comparison shows that the reference values in figure P1 and image 102 deviate from one another with regard to areas marked with a cross in image 102 of FIG. 10.

This means that only the reference values and area identifiers of the changed areas marked with a cross are stored in the memory or transmitted, together with an index showing that the areas concerned are those of image 102. At the same time the reference values of the changed areas are stored into corresponding areas in figure P1 maintained in the memory to replace the reference values maintained earlier for these areas.

If the check shows that image information corresponding to the reference values of the changed areas has not been previously transmitted or stored into the memory, this is carried out similarly as described in connection with the embodiments above.

The same procedure is repeated for all images in the video, the following one being image 103. Hence only information on the changed areas will be stored or forwarded, which reduces the memory capacity needed for storing packed video and, correspondingly, the data transfer capacity needed for transmission.

The image generator, which receives data produced as shown in FIG. 10, generates an image by maintaining in the memory the video image displayed last and updates into this image only the areas for which it receives new data. At the beginning the memory maintains image 100. When it receives data according to which the index is 101 and area A1=REF 235, area A8=REF 5, it updates image area A1 stored in the memory by producing image information corresponding to reference value REF 235 for it and, similarly, image information corresponding to reference value REF 5 for area A8. The image information of other areas it leaves unaltered.

It is to be understood that the above disclosure and the accompanying figures are only meant to illustrate the invention. A person skilled in the art will find it obvious that the invention may be varied and modified also in other ways without departing from the scope of protection of the invention.

The invention claimed is:

1. An image processor configured to perform actions comprising:
   receiving an image comprising image information;
   dividing the received image information into a plurality of areas, each of the plurality of areas having a predetermined size and a unique area identifier;
   taking area-specific samples of the received image information of the plurality of areas and calculating a reference value on the basis of the area-specific samples for each of the plurality of areas, the reference values corresponding only to a visual appearance of a corresponding area, the reference value being distinct from the unique area identifier;
   storing into a memory or transmitting a first reference value calculated for a first area, corresponding received image information for the first area and an area identifier of the first area;

checking whether a second reference value corresponding to a second area is equivalent to the first reference value which has already been stored in the memory or transmitted;

storing into the memory or transmitting the second reference value and the corresponding received image information for the second area, for which the reference value has been calculated, if on the basis of the check the reference value and the corresponding image information have not been stored into the memory or transmitted previously, and storing into the memory or transmitting the second reference value and not the corresponding received image information, for which the reference value has been calculated, if on the basis of the check the reference value and the corresponding image information are currently stored in the memory or have been transmitted previously in connection with the first area or another of the plurality of areas, wherein each of the reference vales comprises a weighted average of area-specific samples of pixels within a corresponding one of the plurality of areas divided by a surface area of the corresponding one of the plurality of areas, and wherein each of the reference values is expressed in pixels, wherein the surface area corresponds to a result of a horizontal number of the pixels in the corresponding one of the plurality of areas and a vertical number of the pixels in the corresponding one of the plurality of areas.

2. An image processor according to claim 1, wherein the image processor is an image processor for a video image and configured to carry out the area-specific storage into the memory or transmission of the calculated reference value and the area identifier for said area by also storing into the memory or transmitting an index showing which image the reference value and the area identifier refer to.

3. An image processor according to claim 1, wherein said image processor is an image processor for a video image and configured to:

check whether the reference value calculated for each of the plurality of areas has changed in comparison with the reference value of a corresponding area in a previous processed image; and to:

carry out the storage into the memory or the transmission of said reference value and the corresponding area identifier and, similarly, the storage into the memory or the transmitting of said image information only if the check shows that the reference value of the area has changed in comparison with a previous processed image.

4. An image processor according to claim 1, wherein the image processor is configured to calculate the reference value by calculating an average of the samples consisting of the values of individual pixels of an area.

5. An image processor according to claim 1, wherein the image processor is configured to take the samples and to calculate the reference value by a supersampling technique.

6. An image generator for generating an image, wherein the image generator is configured to perform actions comprising:

maintaining in a memory reference values and image information corresponding to the reference values;

generating, on the basis of the image information, a part of an image to an image area;

receiving data regarding a first area, including at least an area identifier and a calculated reference value and corresponding image information, the reference value being distinct from the area identifier;

receiving data regarding a second area, checking if the received data regarding the second area also includes image information;

if the check shows that no image information is included, storing into a memory the received reference value and in connection with it the image information, and when the storing is done, carrying out said generation on the basis of the received image information to an image area indicated by the received area identifier; and if the check shows that no image information is included, retrieving from the memory on the basis of the received reference value image information corresponding to the reference value; and carrying out said generation on the basis of the image information retrieved from the memory, to an image area indicated by the received area identifier, wherein each of the reference values comprises a weighted average of area-specific samples of pixels within a corresponding one of the areas divided by a surface area of the corresponding one of the areas, and wherein each of the reference values is expressed in pixels, wherein the surface area corresponds to a result of a horizontal number of the pixels in the corresponding one of the areas and a vertical number of the pixels in the corresponding one of the areas.

7. An image generator according to claim 6, wherein the maintaining in the memory of the reference values and the image information corresponding to the reference values comprises:

receiving the reference values and the image information corresponding to the reference values; and storing into the memory the received reference values and the image information corresponding to the reference values.

8. An image generator according to claim 6, wherein the image generator is a generator for a video image and configured to receive or to retrieve from the memory also an index, in connection with the reception or retrieval from the memory of the area identifiers and the reference value corresponding to each area identifier, an index showing which image the reference value and the area identifier relate to.

9. An image generator according to claims 6, wherein the image generator is configured to generate a video image by maintaining in the memory a previous generated image of the video and to generate the next image on the basis of the image maintained in the memory solely by changing those areas in the previous image for which the image generator reads from the memory or receives the area identifier and the corresponding reference value.

10. A computer program embodied on a non-transitory computer readable medium for processing an image, the computer program is configured to control a computer to:

receive an image comprising image information;

divide the received image information into a plurality of areas, each of the plurality of areas having a predetermined size and a unique area identifier;

take area-specific samples of the received image information of the plurality of areas and calculate a reference value on the basis of the area-specific samples for each of the plurality of areas, the reference values corresponding only to a visual appearance of a corresponding area, the reference value being distinct from the unique area identifier;

store into a memory or to transmit a first reference value calculated for a first area, corresponding received image information for the first area and an area identifier of the first area;

check whether a second reference value corresponding to a second area is equivalent to the first reference value which has already been stored in the memory or transmitted;

store in the memory or to transmit the second reference value and the corresponding received image information for the second area, for which the reference value has been calculated, if according to the check the reference value and the corresponding image information have not been previously stored in the memory or transmitted previously, and storing into the memory or transmitting the second reference value and not the corresponding received image information, for which the reference value has been calculated, if on the basis of the check the reference value and the corresponding image information are currently stored in the memory or have been transmitted previously in connection with the first area or another of the plurality of areas, wherein each of the reference values comprises a weighted average of area-specific samples of pixels within a corresponding one of the areas divided by a surface area of the corresponding one of the areas, and wherein each of the reference values is expressed in pixels, wherein the surface area corresponds to a result of a horizontal number of the pixels in the corresponding one of the areas and a vertical number of the pixels in the corresponding one of the areas.

11. A computer program embodied on a non-transitory computer readable medium for generating an image, wherein the computer program is configured to control a computer to:

maintain in the memory reference values and image information corresponding to the reference values;

generate, on the basis of the image information a part of an image to an image area;

receive data regarding the first area from a memory, the data including at least an area identifier and a calculated reference value and corresponding image information;

receive data regarding a second area, check if the received data regarding the second area also includes image information;

if the check shows that image information is included, store into the memory the received reference value and in connection with it the image information, and when the storing is done, carry out said generation on the basis of the received image information to an image area indicated by the received area identifier; and if the check shows that no image information is included, retrieve from the memory on the basis of the received reference value of each area identifier image information corresponding to the reference value; and to generate, on the basis of the image information retrieved from the memory, an image area indicated by the received area identifier on the basis of the image information retrieved from the memory, on the basis of the reference value corresponding to area identifier, wherein each of the reference values comprises a weighted average of area-specific samples of pixels within a corresponding one of the plurality of areas divided by a surface area of the corresponding one of the plurality of areas, and wherein each of the reference values is expressed in pixels, wherein the surface area corresponds to a result of a horizontal number of the pixels in the corresponding one of the plurality of areas and a vertical number of the pixels in the corresponding one of the plurality of areas.

* * * * *